Patented May 30, 1950

2,510,033

UNITED STATES PATENT OFFICE 2,510,033

MANUFACTURE OF PHOSPHORIC ACID ESTERS

Lucas P. Kyrides, St. Louis, Mo., assignor to Monsanto Chemical Company, St. Louis, Mo., a corporation of Delaware No Drawing. Application April 18, 1947,
Serial No. 742,470

9 Claims. (Cl. 260—461)

This invention provides a process for producing esters of polyphosphoric acids.

The production of esters of the molecularly dehydrated phosphoric acids by the direct reaction of the molecularly dehydrated phosphoric acids and the appropriate alcohol has been proposed. Such processes, however, are known to produce mixtures of the acid esters and the neutral ester, the reaction at the most yielding only small quantities of the desired neutral ester. The separation of the neutral ester from the associated acid esters is difficult, if not impossible.

The production of the said esters has also been proposed by starting with the triester of ortho-phosphoric acid and reacting the same with phosphorus pentoxide. Such process, however, requires the initial preparation of the neutral triesters of ortho-phosphoric acid.

I have now found that the neutral esters of the molecularly dehydrated phosphoric acids may be prepared by reacting phosphorus pentoxide, phosphorus oxychloride and the appropriate anhydrous alcohol in the proportions of one mole of phosphoric pentoxide to from one to six moles of phosphorus oxychloride, the amount of alcohol utilized being at least sufficient to furnish the required hydroxyl hydrogen necessary to combine with the chlorine present to form hydrogen chloride. By this means any of the known polyphosphoric acid esters may be prepared, including tetraalkyl pyrophosphate, hexaalkyl tetraphosphate, pentaalkyl triphosphate, as well as mixtures thereof, together with many other hitherto unidentified esters of polyphosphoric acids.

While I do not completely understand the mechanism of the reactions involved in our new process, I believe that the following equations illustrate the reactions employed as at present understood. By way of example only, the ester produced by the following written reactions is the ethyl ester. However, as will later become clear, any ester of any monohydric alcohol may be prepared in similar fashion. When it is desired to prepare esters of other alcohols, it is necessary merely to substitute the appropriate alcohol in the process described below.

The following chemical equations illustrate but a few of the processes herein disclosed and claimed:

1  $3C_2H_5OH + P_2O_5 + POCl_3 \rightarrow (C_2H_5O)_3P_3O_6 + 3HCl$

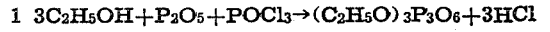

2  $12C_2H_5OH + P_2O_5 + 4POCl_3 \rightarrow$
$3(C_2H_5O)_4P_2O_3 + 12HCl$
Tetraethyl pyrophosphate

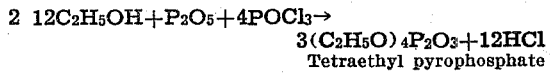

3  $6C_2H_5OH + P_2O_5 + 2POCl_3 \rightarrow$
$(C_2H_5O)_6P_4O_7 + 6HCl$
Hexaethyl tetraphosphate

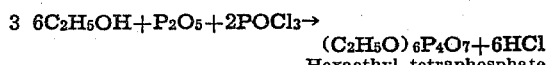

4  $15C_2H_5OH + 2P_2O_5 + 5POCl_3 \rightarrow$
$3(C_2H_5O)_5P_3O_5 + 15HCl$
Pentaethyl triphosphate

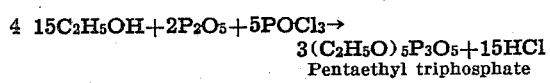

5  $18C_2H_5OH + P_2O_5 + 6POCl_3 \rightarrow$
$(C_2H_5O)_{18}P_8O_{11} + 18HCl$

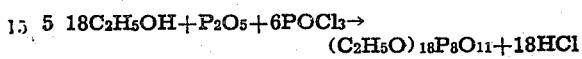

By the term molecularly dehydrated phosphoric acid, or the corresponding esters, I mean phosphoric acids which contain less combined water than does ortho-phosphoric acid ($H_3PO_4$). In this respect this term is used in the same sense as it is in U. S. Patent 2,402,703.

The amount of ethanol indicated by the above equations corresponds to 3 moles of ethanol per mole of $POCl_3$ present in the mixture. This should be understood as being the minimum amount of alcohol required for the reaction. More alcohol than this minimum amount shown may be used. Any excess of alcohol remaining in the product after the reaction has been completed may be removed by distillation or for certain purposes it may be permitted to remain in the product.

The processes illustrated by the chemical equations written above are necessarily carried out under anhydrous conditions in order to prevent hydration of the $P_2O_5$ employed therein and also to prevent hydrolysis of the $POCl_3$ utilized. This process is also desirably carried out at temperatures below 50° C. and this limitation has been found to be important as limiting the formation of alkyl chlorides, the formation of which leads to a lower yield of the desired product. I have found that the mixing together of the reaction ingredients should, therefore, be carried out at temperatures not higher than 50° C. and preferably for the best results below 40° C. Under these conditions little or no chlorination of the alcohol takes place and it is possible to recover substantially all of the chlorine from the reaction mass as hydrogen chloride in which form it is desirably eliminated from the reaction mass.

When the $P_2O_5$ and $POCl_3$ are mixed together in the absence of alcohol the temperature of mixing is not critical. Accordingly, the $P_2O_5$ and the $POCl_3$ may be mixed together at any convenient temperature. When, however, the alcohol is to be added to the mixture of $P_2O_5$ and $POCl_3$, the temperature during such addition should be maintained not above 50° C. and preferably below 40° C. During the removal of the hydrogen chloride by any of the methods suggested herein, it is desirable also to maintain the temperature not above 50° C. and preferably below 40° C. until the chlorine content of the product has been reduced to below 0.1% by weight.

In order to eliminate hydrogen chloride from the reaction mass subsequent to its formation therein, the reaction is desirably carried out under a vacuum, which vacuum may be as high as can practically be obtained. By this means, the gaseous hydrogen chloride present in the reaction mass is rapidly eliminated and the residual chlorine content of the mass is reduced to an amount usually less than 0.1%.

The products produced by the present invention are esters of molecularly dehydrated phosphoric acid or mixtures of such esters. As may be seen from the equations given above, certain of the products are compounds of great complexity. Certain of the esters are well established chemical compounds and may be isolated from the reaction mixture by various means including distillation. An example of an ester which may thus be isolated is the tetraethyl pyrophosphate, which is produced by Reaction 2 above in good yield and which may be further purified if desired by vacuum distillation of the crude reaction product. For most purposes, however, and particularly when the above products are to be employed as insecticides or as ingredients of insecticidal compositions, such purification is generally unnecessary.

It should be understood, therefore, that the present process is not restricted to the preparation of pure compounds but that it may be employed to produce either pure compounds or mixtures of the neutral esters of molecularly dehydrated phosphoric acids.

The present products either in pure form or as the mixtures herein produced, may be employed as insecticides, as plasticizers, or as ingredients of lubricating compositions and for various other purposes.

The alcohols which may be employed in the present process will range in carbon chain length from 2 to 18. The alcohols should be mono-hydric and may be primary or secondary alcohols. By way of example, any of the following alcohols or mixtures thereof may be employed:

Ethyl alcohol
Propyl alcohol
Isopropyl alcohol
n-Butyl alcohol
Secondary butyl alcohol
Isobutyl alcohol
Amyl alcohol
Isoamyl alcohol
n-Hexyl alcohol
2-ethyl butyl alcohol
Cyclohexanol
Octyl alcohol
2-ethyl hexyl alcohol
Capryl alcohol
Decyl alcohol
Lauryl alcohol
Cetyl alcohol
Myristyl alcohol
Stearyl alcohol The procedure is further illustrated by the following examples. However, other procedures may be employed and any order of addition of the reactants may be utilized.

*Example I*

One mole of $P_2O_5$ is mixed with two moles of $POCl_3$, care being exercised to reduce the exposure of these materials to the action of moisture of the air. Ethyl alcohol, at least six moles, is run into the mixture over a period of three hours, the temperature being maintained at approximately 35° C. The mixture is maintained at this temperature for several hours under a vacuum, after which time the hydrolyzable chlorine therein is less than 0.004%. The product produced is hexaethyl tetraphosphate.

*Example II*

One mole of $P_2O_5$ is mixed with two moles of $POCl_3$, the temperature being maintained at 5–10° C. Anhydrous ethanol, six moles, is added to the mixture, the temperature being maintained during this operation below 10° C. After all of the ethanol has been added, the temperature is raised to 35° C. and maintained under a vacuum until the hydrolyzable chlorine present is below 0.1%. The product consists of substantially pure hexaethyl tetraphosphate.

*Example III*

0.5 mole of $P_2O_5$ and two moles of $POCl_3$ are added to 400 cc. of hexane, the solution being cooled to 15° C. While at this temperature six moles of ethanol is added to the hexane solution over a five-hour period and after all of the ethanol has been added the mixture is warmed to a temperature of 40° C. A water pump vacuum is applied to the reaction mixture and the solvent and hydrogen chloride removed at this temperature. The last traces of low boiler present may be removed by further heating to 100° C. under a vacuum. The product thus obtained contains tetraethyl pyrophosphate. Should it be desirable to obtain tetraethyl pyrophosphate in pure form, it may be distilled by fractionating and recovering the fraction boiling at 145–150° C./3 mm. Hg pressure.

*Example IV*

One mole of $P_2O_5$ is added to six moles of ethanol and the resulting mixture is then added to two moles of $POCl_3$. The mixture is maintained at a temperature below 50° C. until the hydrolyzable chlorine therein is below 0.1%. The product consists of hexaethyl tetraphosphate.

*Example V*

One mole of $P_2O_5$ is added to six moles of ethanol and thereafter two moles of $POCl_3$ are added to the $P_2O_5$ in ethanol. The temperature is maintained below 40° C. under a vacuum until substantially all of the hydrogen chloride formed in the reaction has been evolved. The product produced consists of hexaethyl tetraphosphate.

*Example VI*

Six moles of ethanol and one mole of $P_2O_5$ are added separately and simultaneously to two moles of $POCl_3$. The reaction mixture thus produced is maintained at a temperature below 40° C. until the hydrolyzable chlorine therein is below 0.1%. The product thus obtained consists of hexaethyl tetraphosphate.

*Example VII*

Six moles of ethanol, one mole of $POCl_3$ and one mole of $P_2O_5$ are mixed together and maintained at a temperature below 50° C. until the hydrolyzable chlorine therein is below 0.1%. The product consists of a neutral ester of a polyphosphoric acid of unknown composition.

*Example VIII*

A mixture is made containing five moles of ethanol, one mole of POCl$_3$ and one mole of P$_2$O$_5$. The temperature is maintained below 40° C. until the hydrolyzable chlorine therein is below 0.1%. The product consists of a mixture of esters of polyphosphoric acids of unknown composition.

*Example IX*

A mixture is prepared from ethanol, P$_2$O$_5$ and POCl$_3$ in the molar ratio 6.75:0.5:2.25. Upon the elimination of substantially all of the hydrolyzable chlorine the product consisted of a yellow oil containing a major proportion of tetraethyl pyrophosphate.

*Example X*

A mixture is prepared as in Example 9 above containing ethanol, P$_2$O$_5$ and POCl$_3$ in the molar ratio 7.5:0.5:2.5. After elimination of hydrogen chloride, as described in Example IX, the products consist largely of tetraethyl pyrophosphate.

*Example XI*

A mixture is prepared from ethanol, P$_2$O$_5$ and POCl$_3$ in the molar ratio 8.25:0.5:2.75. Hydrogen chloride is eliminated from the mixture, which thereafter contains a substantial proportion of tetraethyl pyrophosphate.

*Example XII*

A mixture is prepared of one mole of P$_2$O$_5$, one mole of POCl$_3$ and three moles of isopropanol, while maintaining the temperature at 40° C. HCl is eliminated from the mixture by passing through the mixture a stream of dry air, the passage of which is continued until the chlorine content has been reduced to 0.05% by weight. The product remaining is a yellow oil which is the isopropyl ester of a polyphosphoric acid.

*Example XIII*

A mixture is made of twelve moles of isobutanol, one mole of P$_2$O$_5$ and four moles of POCl$_3$. HCl is eliminated from the mixture as described in Example XII and when the chlorine present has been substantially all eliminated the product consists of substantially pure tetrabutyl pyrophosphate.

*Example XIV*

A mixture is made of eighteen moles of 2-ethylhexanol, one mole of P$_2$O$_5$ and six moles of POCl$_3$ in 500 cc. of xylene, the temperature during mixing of the ingredients being maintained at approximately 35° C. HCl is eliminated by warming the mass to about 50° C. under vacuum. Some xylene is vaporized during the removal of the HCl. After the HCl has been reduced to less than 0.05% the remainder of the xylene is removed by distillation at about 100° C. under vacuum, the product being a yellow oil and consisting of the 2-ethylhexyl ester of a complex polyphosphoric acid.

*Example XV*

One mole of P$_2$O$_5$ and four moles of POCl$_3$ are added to 600 cc. of hexane at 20° C. and while the mixture is maintained by cooling at approximately this temperature, twelve moles of lauryl alcohol are gradually added thereto. After the alcohol has all been added, a stream of dry air is passed through the mixture and HCl eliminated thereby. When the chlorine content is down to 0.01% or below, the temperature may be raised to the boiling point of hexane, which is then distilled off. The product remaining is tetralauryl pyrophosphate.

*Example XVI*

Two moles of P$_2$O$_5$ and five moles of POCl$_3$ are added to 600 cc. of ethylene dichloride at room temperature. The temperature of the solution is then lowered to 10° C. by cooling and then 15 moles of stearyl alcohol are gradually added. The mixture is heated to 45° C. and the HCl removed under reduced pressure. The chlorine content is reduced to 0.1% and the product remaining in the reaction vessel is pentastearyl triphosphate.

Any of the above reactions may be carried out by employing a mixture of any of the alcohols above disclosed instead of employing only a single alcohol. By proceeding in this manner, mixed esters of the polyphosphoric acids may be prepared. The following example is given by way of illustration.

*Example XVII*

One mole of P$_2$O$_5$ is added to four moles of POCl$_3$ at a temperature of about 40° C. The mixture is then cooled to about 10° C. and a mixture consisting of six moles of ethanol and six moles of 2-ethylhexanol is slowly added thereto. Upon completion of the alcohol addition, the temperature is raised to 35° C. and HCl is removed by the application of a vacuum. The product, a viscous, yellow oil, is recovered and is found to be diethyl di(2-ethylhexyl) pyrophosphate, which is recovered in substantially quantitative yield.

The removal of hydrogen chloride may be carried out in various ways. As pointed out in the above examples, HCl is most conveniently removed by warming the reaction product at a temperature not higher than 50° C. and preferably below 40° C. Shaking and stirring may be resorted to in order to facilitate the removal of HCl. The reaction mixture may also be atomized into a chamber containing warm air, the HCl being removed from the collecting chamber by means of a stream of dry air. When solvents are employed in the reaction, as described above, the evaporation of the solvent will serve to carry the HCl out of the liquid mass. It will also be understood that any inert solvent such as benzene, toluene, xylene, hexane, carbon tetrachloride, chloroform, ethylene dichloride, etc., may be employed during the mixing and condensation steps described above.

The novel compounds of the present invention may be formulated into insecticidal compositions in any desired form, for example, as dusts, aqueous solutions, or oil-in-water emulsions. For example, a dust composition may be prepared by applying from 3 to 5% of any of the compounds of Examples I to XVII to an inert carrier such as pyrophyllite by any desirable means. The resulting dust can then be applied to plants for the purpose of effecting kills on insect life found thereon such as aphids and red spider. The novel compositions of the present invention may also be dispersed in water in the ratio of 1:200 to 1:800, more or less, and the resulting aqueous dispersion may then be sprayed upon insect infested plants. As an example of a suitable emulsion for insecticidal use, 50 parts of any of the compounds of Examples I to XVII may be dispersed in 45 parts of xylene and 5 parts of a non-ionic wetting agent may be added thereto. Illustrative of suitable non-ionic wetting agents for the purpose are the condensation products resulting from the condensation of alkyl phenols with polyethylene glycols. The resulting concentrate may then be added to water in the ratio of 1:200 to 1:800, more or less, and the mixture agitated to produce an emulsion. The emulsion may then be applied to the plants for the control of insect life thereon.

What I claim is:

1. The process which comprises reacting together under anhydrous conditions and at a temperature not higher than 50° C. a mixture consisting of $P_2O_5$, $POCl_3$ and a monohydric alcohol, the amount of $P_2O_5$ in the mixture being 1 mole for each 1 to 6 moles of $POCl_3$ present therein and the amount of alcohol being sufficient to combine with the chlorine originally present as $POCl_3$ to form HCl, and withdrawing HCl from said mixture while said temperature is maintained not higher than 50° C.

2. The process which comprises reacting $P_2O_5$ and $POCl_3$ in the proportions of 1 mole of $P_2O_5$ with from 1 to 6 moles $POCl_3$ and then while maintaining the temperature not higher than 50° C. reacting the product further with a monohydric alcohol, the proportion of alcohol required being at least sufficient to furnish sufficient hydroxyl hydrogen in order to combine with substantially all of the chlorine present as $POCl_3$ and to form HCl therewith, and while maintaining the temperature not higher than 50° C. withdrawing HCl from said mixture.

3. The process which comprises mixing and reacting together, at a temperature not higher than 50° C., a monohydric alcohol having from 2 to 18 carbon atoms, $P_2O_5$ and $POCl_3$, the molecular proportion of $P_2O_5$ in the mixture being 1 mole for each 1 to 6 moles of $POCl_3$ present therein, and the amount of alcohol present being at least 3 moles for each mole of $POCl_3$ present therein, and while maintaining the temperature not higher than 50° C. eliminating HCl from the mixture.

4. The process which comprises mixing and reacting together, at a temperature not higher than 50° C., ethanol, $P_2O_5$ and $POCl_3$, the molecular proportion of $P_2O_5$ in the mixture being 1 mole for each 1 to 6 moles of $POCl_3$ present therein, and the amount of ethanol supplied being at least 3 moles for each mole of $POCl_3$ present therein, and while maintaining the temperature of said mixture not higher than 50° C. eliminating HCl from the said mixture by the application of a reduced pressure to said mixture.

5. The process which comprises mixing and reacting together, at a temperature not higher than 50° C., ethanol, $P_2O_5$ and $POCl_3$ substantially in the molecular proportion: ethanol, 6 moles; $P_2O_5$, 0.5 mole; $POCl_3$, 2 moles; and while said mixture is maintained at a temperature not higher than 50° C., removing hydrogen chloride therefrom until the mixture contains less than 0.1% of chlorine.

6. The process which comprises mixing and reacting together, at a temperature not higher than 50° C., $P_2O_5$ and $POCl_3$ in the proportion of 1 mole of $P_2O_5$ with from 1 to 6 moles of $POCl_3$, then adding a monohydric alcohol having from 2 to 18 carbon atoms in the molecule, in an amount corresponding at least to 3 moles of alcohol per mole of $POCl_3$, while maintaining the temperature below 50° C. removing HCl from the mass until the chlorine content is below 0.1% by weight.

7. The process which comprises mixing together, at a temperature not higher than 40° C., $P_2O_5$ and $POCl_3$ in the proportion of 1 mole of $P_2O_5$ with from 1 to 6 moles of $POCl_3$, then adding anhydrous ethanol in amount corresponding to at least 3 moles per mole of $POCl_3$ present, and then while maintaining the temperature of said mixture not higher than 40° C. removing HCl from the mass until the chlorine content is below 0.1% by weight.

8. The process which comprises mixing and reacting together, at a temperature not higher than 50° C., $P_2O_5$, $POCl_3$ and ethanol in the proportion of 1 mole of $P_2O_5$ to 4 moles of $POCl_3$ and with at least 12 moles of ethanol, removing HCl from the mixture at a temperature below 50° C. and then fractionating the product under reduced pressure to recover tetraethyl pyrophosphate.

9. The process which comprises mixing and reacting together, at a temperature not higher than 40° C., $P_2O_5$, $POCl_3$ and ethanol in the proportion of 1 mole of $P_2O_5$ to 2 moles of $POCl_3$, and at least 6 moles of ethanol, removing HCl from the mixture while at a temperature not higher than 50° C., until the chlorine content of the mixture is below 0.1%.

LUCAS P. KYRIDES.

REFERENCES CITED

The following references are of record in the file of this patent:

UNITED STATES PATENTS

| Number | Name | Date |
|---|---|---|
| 2,121,611 | Salzberg | June 21, 1938 |
| 2,336,302 | Schrader | Dec. 7, 1943 |
| 2,402,703 | Woodstock | June 25, 1946 |

OTHER REFERENCES

Gustavson, "Ber. Deutsch. Chem. Ges.," vol. 4 (1871), page 853.

Geuther et al., "Ber. Deutsch. Chem. Ges.," vol. 4 (1871), pgs. 766–768.

Geuther et al., "Ber. Deutsch. Chem. Ges.," vol. 4 (1871), pgs. 769–770.

Huntly, "Jour. Chem. Soc." (London), vol. 59 (1891), pgs. 202–208.